(12) United States Patent
Attar et al.

(10) Patent No.: US 9,681,057 B2
(45) Date of Patent: Jun. 13, 2017

(54) EXPOSURE TIMING MANIPULATION IN A MULTI-LENS CAMERA

(75) Inventors: Ziv Attar, Zihron Yaakov (IL); Chen Aharon-Attar, Zihron Yaakov (IL)

(73) Assignee: LinX Computational Imaging Ltd., Zichron Yaakov, IL (US)

( * ) Notice: Subject to any disclaimer, the term of this patent is extended or adjusted under 35 U.S.C. 154(b) by 137 days.

(21) Appl. No.: 13/881,123

(22) PCT Filed: Oct. 24, 2011

(86) PCT No.: PCT/NL2011/050724
§ 371 (c)(1),
(2), (4) Date: Jul. 8, 2013

(87) PCT Pub. No.: WO2012/057621
PCT Pub. Date: May 3, 2012

(65) Prior Publication Data
US 2013/0278802 A1    Oct. 24, 2013

Related U.S. Application Data

(60) Provisional application No. 61/406,148, filed on Oct. 24, 2010.

(51) Int. Cl.
*H04N 3/14* (2006.01)
*H04N 5/335* (2011.01)
(Continued)

(52) U.S. Cl.
CPC ......... *H04N 5/2351* (2013.01); *H04N 5/2226* (2013.01); *H04N 5/2253* (2013.01);
(Continued)

(58) Field of Classification Search
CPC .. H04N 5/2226; H04N 5/23229; H04N 5/262; H04N 5/2621; H04N 5/232; H04N 5/3532; H04N 5/2351; H04N 9/097; H04N 5/2254; H04N 9/045; H04N 5/02; G02B 13/0015; G02B 13/006
See application file for complete search history.

(56) References Cited

U.S. PATENT DOCUMENTS

4,890,905 A    1/1990  Van Rosmalen et al.
5,347,340 A    9/1994  Tsukada
(Continued)

FOREIGN PATENT DOCUMENTS

EP    1206126 A2    5/2002
EP    2336816 A2    6/2011
(Continued)

OTHER PUBLICATIONS

PCT International Search Report, PCT Application No. PCT/NL2011/050722, Apr. 16, 2012, 7 pages.
(Continued)

*Primary Examiner* — Chia-Wei A Chen
(74) *Attorney, Agent, or Firm* — Blank Rome LLP

(57) ABSTRACT

The exposure of pixel lines in one or more image sensor regions is substantially synchronized. Each image sensor region is associated with a different lens in a multi-lens camera system. For a first pixel line in a first image sensor region and a second pixel line in a second image sensor region corresponding to the same portion of a field of view, the first pixel line and the second pixel line are sequentially or substantially simultaneously exposed. After exposing the first pixel line and the second pixel line, image information associated with the exposures is combined and output on the same readout line.

22 Claims, 6 Drawing Sheets

(51) Int. Cl.

| | |
|---|---|
| *G03B 7/00* | (2014.01) |
| *H04N 5/235* | (2006.01) |
| *H04N 5/238* | (2006.01) |
| *H04N 5/222* | (2006.01) |
| *H04N 5/232* | (2006.01) |
| *H04N 5/262* | (2006.01) |
| *H04N 9/04* | (2006.01) |
| *H04N 5/353* | (2011.01) |
| *H04N 5/225* | (2006.01) |
| *H04N 9/097* | (2006.01) |
| *H04N 5/265* | (2006.01) |

(52) U.S. Cl.
CPC ......... *H04N 5/2254* (2013.01); *H04N 5/2258* (2013.01); *H04N 5/232* (2013.01); *H04N 5/23229* (2013.01); *H04N 5/23232* (2013.01); *H04N 5/262* (2013.01); *H04N 5/265* (2013.01); *H04N 5/2621* (2013.01); *H04N 5/3532* (2013.01); *H04N 9/045* (2013.01); *H04N 9/097* (2013.01)

(56) References Cited

U.S. PATENT DOCUMENTS

| | | | |
|---|---|---|---|
| 6,115,065 A | 9/2000 | Yadid-Pecht et al. | |
| 6,765,617 B1 | 7/2004 | Tangen | |
| 6,773,638 B2 | 8/2004 | Kloosterboer et al. | |
| 6,809,766 B1 | 10/2004 | Krymski et al. | |
| 6,898,331 B2 | 5/2005 | Tiana | |
| 6,980,248 B1 | 12/2005 | Suda | |
| 7,151,259 B2 | 12/2006 | Koch et al. | |
| 7,199,348 B2 * | 4/2007 | Olsen et al. | 250/208.1 |
| 7,224,384 B1 | 5/2007 | Iddan | |
| 7,233,359 B2 | 6/2007 | Suda | |
| 7,262,799 B2 | 8/2007 | Suda | |
| 7,564,019 B2 * | 7/2009 | Olsen et al. | 250/208.1 |
| 7,620,309 B2 | 11/2009 | Georgiev | |
| 7,718,940 B2 | 5/2010 | Hirasawa | |
| 7,916,181 B2 | 3/2011 | Nilehn | |
| 7,932,941 B2 | 4/2011 | Hayasaka | |
| 8,023,016 B2 | 9/2011 | Iijima | |
| 8,049,806 B2 | 11/2011 | Feldman | |
| 8,228,417 B1 * | 7/2012 | Georgiev et al. | 348/340 |
| 8,259,212 B2 * | 9/2012 | Brady et al. | 348/340 |
| 8,290,358 B1 | 10/2012 | Georgiev | |
| 8,315,476 B1 | 11/2012 | Georgiev | |
| 8,345,144 B1 * | 1/2013 | Georgiev et al. | 348/340 |
| 8,436,909 B2 | 5/2013 | Farina | |
| 8,471,920 B2 | 6/2013 | Georgiev | |
| 8,514,491 B2 | 8/2013 | Duparre | |
| 8,611,693 B2 | 12/2013 | Intwala | |
| 8,629,390 B2 * | 1/2014 | Olsen et al. | 250/208.1 |
| 8,749,694 B2 | 6/2014 | Georgiev | |
| 8,760,558 B2 | 6/2014 | Morita | |
| 8,817,015 B2 | 8/2014 | Georgiev | |
| 8,885,059 B1 | 11/2014 | Venkataraman | |
| 2001/0026322 A1 * | 10/2001 | Takahashi et al. | 348/340 |
| 2002/0067416 A1 | 6/2002 | Yoneda et al. | |
| 2002/0089596 A1 | 7/2002 | Suda | |
| 2002/0122124 A1 | 9/2002 | Suda | |
| 2003/0108240 A1 | 6/2003 | Gutta | |
| 2003/0234907 A1 | 12/2003 | Kawai | |
| 2004/0047518 A1 | 3/2004 | Tiana | |
| 2004/0080661 A1 | 4/2004 | Afsenius et al. | |
| 2004/0109004 A1 | 6/2004 | Bastos et al. | |
| 2004/0201748 A1 | 10/2004 | Goldstein | |
| 2005/0052751 A1 * | 3/2005 | Liu et al. | 359/626 |
| 2005/0128323 A1 | 6/2005 | Choi | |
| 2005/0128335 A1 * | 6/2005 | Kolehmainen et al. | 348/340 |
| 2005/0128509 A1 * | 6/2005 | Tokkonen et al. | 358/1.15 |
| 2005/0134699 A1 | 6/2005 | Nagashima | |
| 2005/0151866 A1 * | 7/2005 | Ando | H04N 5/2355 348/297 |
| 2005/0160112 A1 * | 7/2005 | Makela et al. | 707/103 R |
| 2005/0225654 A1 | 10/2005 | Feldman et al. | |
| 2005/0259169 A1 * | 11/2005 | Ito | H04N 3/1593 348/308 |
| 2005/0270395 A1 * | 12/2005 | Yoneda et al. | 348/308 |
| 2006/0003328 A1 | 1/2006 | Grossberg | |
| 2006/0055811 A1 * | 3/2006 | Frtiz et al. | 348/340 |
| 2006/0108505 A1 | 5/2006 | Gruhlke et al. | |
| 2006/0125936 A1 | 6/2006 | Gruhike | |
| 2006/0193509 A1 | 8/2006 | Criminisi et al. | |
| 2007/0075218 A1 | 4/2007 | Gates | |
| 2007/0091197 A1 | 4/2007 | Okayama | |
| 2007/0153086 A1 | 7/2007 | Usui et al. | |
| 2007/0177004 A1 * | 8/2007 | Kolehmainen et al. | 348/42 |
| 2007/0189748 A1 | 8/2007 | Drimbarean et al. | |
| 2007/0211164 A1 | 9/2007 | Olsen et al. | |
| 2007/0252074 A1 * | 11/2007 | Ng et al. | 250/208.1 |
| 2007/0252908 A1 * | 11/2007 | Kolehmainen | 348/265 |
| 2007/0258006 A1 | 11/2007 | Olsen et al. | |
| 2008/0068452 A1 | 3/2008 | Nakao | |
| 2008/0079839 A1 | 4/2008 | Sung et al. | |
| 2008/0084486 A1 * | 4/2008 | Enge et al. | 348/239 |
| 2008/0218611 A1 | 9/2008 | Parulski et al. | |
| 2008/0219493 A1 | 9/2008 | Tadmor | |
| 2008/0240508 A1 * | 10/2008 | Nakao | G01P 3/68 382/107 |
| 2008/0278610 A1 | 11/2008 | Boettiger | |
| 2009/0021612 A1 * | 1/2009 | Hamilton, Jr. | H04N 5/3452 348/249 |
| 2009/0103792 A1 | 4/2009 | Rahn et al. | |
| 2009/0140131 A1 * | 6/2009 | Utagawa | 250/226 |
| 2009/0262987 A1 | 10/2009 | Ioffe et al. | |
| 2009/0321861 A1 | 12/2009 | Oliver et al. | |
| 2010/0020078 A1 | 1/2010 | Shpunt | |
| 2010/0021064 A1 | 1/2010 | Lee et al. | |
| 2010/0039713 A1 | 2/2010 | Lusinchi et al. | |
| 2010/0052192 A1 | 3/2010 | Hasegawa et al. | |
| 2010/0085468 A1 | 4/2010 | Park | |
| 2010/0097491 A1 | 4/2010 | Farina | |
| 2010/0117176 A1 | 5/2010 | Uekawa | |
| 2010/0127157 A1 | 5/2010 | Tamaki et al. | |
| 2010/0128137 A1 * | 5/2010 | Guidash | H04N 5/232 348/222.1 |
| 2010/0171866 A1 | 7/2010 | Brady | |
| 2010/0253833 A1 * | 10/2010 | Deever | H04N 5/3456 348/362 |
| 2010/0259607 A1 | 10/2010 | Kennedy et al. | |
| 2010/0283837 A1 | 11/2010 | Oohchida | |
| 2011/0019048 A1 * | 1/2011 | Raynor | H01L 27/14645 348/302 |
| 2011/0069189 A1 | 3/2011 | Venkataraman | |
| 2011/0080487 A1 | 4/2011 | Venkataraman et al. | |
| 2011/0122308 A1 | 5/2011 | Duparre | |
| 2011/0134282 A1 | 6/2011 | Morita et al. | |
| 2011/0157387 A1 | 6/2011 | Han | |
| 2011/0242356 A1 * | 10/2011 | Aleksic | H04N 5/2258 348/222.1 |
| 2012/0007942 A1 | 1/2012 | Michrowski et al. | |
| 2012/0140100 A1 | 6/2012 | Shibazaki | |
| 2013/0002928 A1 | 1/2013 | Imai | |
| 2013/0121615 A1 | 5/2013 | Intwala | |
| 2013/0128087 A1 | 5/2013 | Georgiev | |
| 2013/0293744 A1 | 11/2013 | Attar | |
| 2013/0308197 A1 | 11/2013 | Duparre | |
| 2013/0321674 A1 | 12/2013 | Cote | |
| 2013/0335598 A1 | 12/2013 | Gustavsson | |
| 2013/0335621 A1 | 12/2013 | Attar | |
| 2015/0234151 A1 | 8/2015 | Venkataraman | |
| 2015/0235371 A1 | 8/2015 | Venkataraman | |
| 2015/0296193 A1 | 10/2015 | Cote | |

FOREIGN PATENT DOCUMENTS

| | | |
|---|---|---|
| JP | 2000 152281 A | 5/2000 |
| JP | 2001078212 A | 3/2001 |
| JP | 2002135795 A | 5/2002 |
| JP | 2002171430 A | 6/2002 |
| JP | 2005 109622 A | 4/2005 |

(56) References Cited

FOREIGN PATENT DOCUMENTS

| JP | 2005 303694 A | 10/2005 |
|---|---|---|
| JP | 2006246193 A | 9/2006 |
| JP | 2007 158825 A | 6/2007 |
| JP | 2008099329 A | 4/2008 |
| JP | 2010004090 A | 1/2010 |
| JP | 2011 109484 A | 6/2011 |
| WO | WO 03/049035 A2 | 6/2003 |
| WO | WO 2004/021264 A1 | 3/2004 |
| WO | WO 2004/027880 A2 | 4/2004 |
| WO | 2006039486 A2 | 4/2006 |
| WO | WO 2007/005714 A2 | 1/2007 |
| WO | WO 2008/085679 A1 | 7/2008 |
| WO | WO 2008/087652 A2 | 7/2008 |
| WO | WO 2009/123278 A1 | 10/2009 |
| WO | WO 2009/151903 A2 | 12/2009 |
| WO | WO 00/22566 A1 | 4/2010 |
| WO | WO 2010/059182 A1 | 5/2010 |
| WO | WO 2010/078563 A1 | 7/2010 |

OTHER PUBLICATIONS

PCT Written Opinion, PCT Application No. PCT/NL2011/050722, Apr. 16, 2012, 14 pages.
PCT International Search Report, PCT Application No. PCT/NL2011/050723, Apr. 20, 2012, 6 pages.
PCT Written Opinion, PCT Application No. PCT/NL2011/050723, Apr. 20, 2012, 12 pages.
PCT International Search Report, PCT Application No. PCT/NL2011/050724, Feb. 6, 2012, 4 pages.
PCT Written Opinion, PCT Application No. PCT/NL2011/050724, Feb. 6, 2012, 5 pages.
PCT International Search Report, PCT Application No. PCT/NL2011/050725, Feb. 1, 2012, 4 pages.
PCT Written Opinion, PCT Application No. PCT/NL2011/050725, Feb. 1, 2012, 10 pages.
PCT International Search Report, PCT Application No. PCT/US2011/050726, Mar. 29, 2012, 6 pages.
PCT Written Opinion, PCT Application No. PCT/US2011/050726, Mar. 29, 2012, 10 pages.
Mirotznik, M. et al., "A Practical Enhanced-Resolution Integrated Optical-Digital Imaging Camera," Proceedings of SPIE, Modeling and Simulation for Military Operations IV, Trevisani, D.A. (ed.), Jan. 2009, pp. 743806-1-743806-9, vol. 7348.
Horstmeyer, R. et al., "Flexible Multimodal Camera Using a Light Field Architecture," 2009 IEEE International Conference on Computational Photography (ICCP2009), IEEE, Apr. 16, 2009, pp. 1-8.
Horisaki, R. et al., "A Compound-Eye Imaging System with Irregular Lens-Array Arrangement," Proceedings of SPIE, Optics and Photonics for Information Processing II, Awwal, A.A.S. et al. (eds.), Aug. 13-14, 2008, pp. 70720G1-70720G-9, vol. 7072.

* cited by examiner

EXPOSURE TIMING MANIPULATION IN A MULTI-LENS CAMERA

CROSS REFERENCE TO RELATED APPLICATIONS

This application is a national phase application of PCT/NL2011/050724, entitled "System and Method for Imaging Using Multi Aperture Camera," filed on Oct. 24, 2011, which in turn claims priority to U.S. Provisional Application No. 61/406,148, filed on Oct. 24, 2010, the contents of which are all hereby incorporated by reference in their entirety.

BACKGROUND

Technical Field

This disclosure relates to a camera system, and more specifically, to a camera system with multiple lenses configured to manipulate electronic rolling shutter ("ERS") exposure timing during image capture.

Description of the Related Art

An imaging system typically consists of an imaging lens and an image sensor. An imaging lens collects light emitted or reflected from objects in a scene and directs collected light upon the image sensor. An image sensor is a photosensitive device that converts light incident upon the image sensor during an image capture to an electronic signal representative of the captured light. To obtain color image data, a color filter array (such as a Bayer filter) is used in conjunction with the image sensor to separate between different spectral regions of the total light spectrum of the image being captured. Color filter arrays separate captured light into (for instance) green image planes, red image planes, and blue image planes.

Given an image sensor's active area dimension (the image sensor's "format") and the desired field of view, the focal length of a lens can be calculated. The size of the aperture of the lens can be set according to image sensor's photo sensitivity, exposure time, and noise level tolerance. The focal length divided by the aperture's size is called the "F-number," and indicates the ability of the lens to collect light. Lower F-Numbers are associated with more light being collected by the lens and directed upon the image sensor.

A phenomena caused by the use of color filter arrays is the appearance of color artifacts also caused by the spatial disposition of the different colors. For example, in a captured image of a white line 1 pixel deep on a black background, the white line will appear in various colors depending on the position of the light from the line incident upon the image sensor. Multi-lens systems can be implemented to reduce such artifacts, but can be accompanied by issues of increased system cost and complexity. A typical CMOS image sensor can allow a camera system to expose, for each of a plurality of rows of pixels, the row of pixels for a period of time (the "exposure time").

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
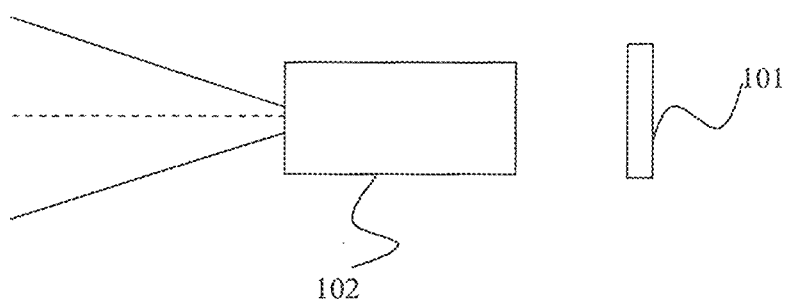
FIG. 1 illustrates a side view of a single lens camera, according to one example embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A multi-lens camera system can manipulate image sensor exposure timing, resulting in a reduction of spatial discrepancies for images of objects in motion. Each lens in a multi-lens camera system is associated with a different image sensor region. As used herein, "image sensor region" refers to a distinct portion of an image sensor, or refers to an entire image sensor. For example, four image sensor regions may refer to four distinct portions of one image sensor, may refer to two portions of each of two image sensor, or may refer to four image sensors. The term "multi-lens digital camera" or "multi-aperture digital camera" as used herein refers to a camera including more than one lens, each with an aperture and various lens elements. The term "initial image" as used herein refers to an image captured by an image sensor region, and the term "final image" as used herein refers to an image created based on the combination of one or more initial images.

Exposure Timing Manipulation Overview

Image capture with a multi-lens camera system using an ERS can result in spatial artifacts between lenses for objects in motion relative to the camera system. This phenomena is illustrated in greater detail within FIG. 9 and the associated description below. Manipulating the timing of row exposures in such a camera system can help prevent such artifacts, while minimizing the number of rows in a memory buffer needed for processing captured images.

The multi-lens camera system can include one or more color filters, polarized filters, chromatic filters, and neutral density filters integrated within the system configured to filter collected light prior to capture by the image sensor. Each initial image can have a different light intensity from other initial images. The multi-lens camera system can include an algorithm for adding initial images to form a final image having higher dynamic range than the initial images. Each lens in the multi-lens camera system can have a different F-Number than the other lenses, and can be focused to a different distance than the other lenses.

The multi-lens camera system described herein is configured to capture initial images associated with one or more lenses resulting from the transmitting of reflected or emitted light by the lenses onto one or more image sensor regions. The initial images are captured by the image sensor by manipulating the exposure timing of image sensor pixel rows. Image sensor region pixel rows corresponding to similar field of view portions are exposed with a minimized time difference.

In one embodiment, the pixel rows of a four-lens camera arranged in a 2×2 lens array with 2n rows are exposed according to sequence: 1, n+1, 2, n+2, . . . n, 2n. In such an embodiment, pixel rows can be read out from the image sensor according to the same sequence, and the final image can be generated by combining the rows 1 and n+1, 2 and n+2, and so forth. As similar portions of the final image are captured at near similar times, the amount of memory required to stored captured pixel rows can be reduced.

It should be noted that in other embodiments, any configuration of lens array can be used according to the principles described herein. For instance, a 3×2 lens array or a 4×1 lens array can be used. Further, each lens in the lens array can capture initial images of varying sizes. For example, a top row of lenses can include 500 pixel rows, and a bottom row of lenses can include 100 pixel rows. In such embodiments, the pixel row exposure sequence can be adjusted so that similarly located portions of a field of view are captured at substantially similar times. Continuing with the previous example, the pixel row exposure sequence can be: row 1, row 501, row 502, row 2, row 503, row 504, and so forth.

In other embodiments, a pixel row exposure sequence for an image sensor with 2n rows can be:

1, 2, n+1, n+2, 3, 4, n+3, n+4, . . . , n−1, n, 2n−1, 2n
1, 2, . . . , x, n+1, n+2, . . . , n+x, n−x, . . . , n−1, n, 2n−x, . . . , 2n−1, 2n

In some embodiments, pixel rows corresponding to similarly located portions of a field of view are captured substantially simultaneously, for instance rows 1 and n+1 are captured at a first time, rows 2 and n+2 are captured at a second time, and so forth. In another example, rows 1, 2, n+1, and n+2 are captured at a first time, rows 3, 4, n+3, and n+4 are captured at a second time, and so forth. In such embodiments, image sensor regions can be synchronized. In some embodiments, the pixel rows of each image sensor region can be exposed according to differing exposure sequences. For instance, the pixel rows of three image sensor regions (for instance, corresponding to a lens with a green filter, a lens with a red filter, and a lens with a blue filter) can be exposed based on a similar sequence, while the pixel rows of a fourth image sensor region (for instance, corresponding to a lens with a while balance filter) can be exposed based on a separate sequence (for instance, based on a predefined sequence, based on various image information of the exposure of the other lenses, based on a user setting, based on a previously captured image, and the like). Such embodiments can allow for increasing the dynamic range of a final image.

The multi-lens camera system can include one output channel/readout line configured to read out image sensor pixel rows associated with similarly located portions of a field of view or exposed at substantially similar times. Such a configuration beneficially reduces the amount of input/output lines associated with the image sensor. The multi-lens camera system can also include a memory buffer configured to store image information received from exposing image sensor pixel rows associated with similarly located portions of a view of view together. For example, if row 1 and row n+1 of an image sensor are exposed sequentially, row 1 and n+1 can be stored together in a buffer. This allows for pixel rows associated with similarly located portions of a field of view to be read out from the buffer together, and to be combined to form a portions of the final image representative of the similarly located portions of the field of view. Thus, while various pixel row exposure sequences are described herein, it should be noted that such sequences can also refer to the readout of pixel row image information from a buffer or memory.

As noted above, the multi-lens camera system can include neutral density filters, polarizing filters, and chromatic filters configured to increase final image dynamic range, reduce reflection and color artifacts, and the like. The multi-lens camera system can include a micro lens for increasing the light collection efficiency of pixels having more than one center of symmetry. In some embodiments, the number of centers of symmetry is based on the number of lenses, and each center of symmetry can be created opposite a center of an opposite lens associated with a sub-image including a corresponding center of symmetry.

In an imaging system containing multi apertures as described above, each lens and the area of the sensor in which the lens forms an image on can be referred to as an imaging channel. The digital camera is composed of two or more imaging channels where the imaging lens of each channel can be different than the imaging lens of other channels.

The focal length of a lens is defined by the distance in which the lens will form an image of an object that is positioned at infinity. The lens F-Number is defined as the focal length divided by the entrance pupil diameter which is set by the lens aperture. The maximal achievable modulation transfer function of a lens with a given F-Number is limited by the diffraction effect.

An ideal multi-lens camera system can include a global ERS that exposes all image sensor pixel rows simultaneously. However, such a system may be infeasible to do memory read and write speeds, required system power, and the like. As a result, the multi-lens camera system described herein manipulates image sensor pixel row exposure timing such that the exposure of pixel rows for the entire image sensor is non-sequential.

System Overview

The system and method described herein provide high quality imaging while considerably reducing the length of the camera as compared to other systems and methods.

Specifically, one benefit of the multi-lens camera system and method is to improve image capturing devices while maintaining the same field of view. This is accomplished by using 2 or more lenses in a lens array. Each lens forms a small image of a field of view. Each lens transfers light emitted or reflected from objects in the field of view onto a proportional area in the image sensor. The optical track of each lens is proportional to the segment of the image sensor which the emitted or reflected light is projected on. Therefore, when using smaller lenses, the area of the image sensor which the emitted or reflected light is projected on, referred hereinafter as the active area of the image sensor, is smaller. When the image sensor is active for each lens separately, each initial image formed is significantly smaller as compare to using one lens which forms an entire image. One lens camera transfers emitter or reflected light onto the entire image sensor area.

Instead of using a single lens to form a large image covering the complete sensor active area, two or more lenses are used, where each forms a small image covering only a part of the sensor's active area. An image sensor may not have any color mask on its active area; instead each lens will have a color filter integrated within the optical barrel or in front of the lens (between the lens and the scene) or between the lens and the sensor or placed on top of the sensor part that is used with the specific lens.

Figure 2:
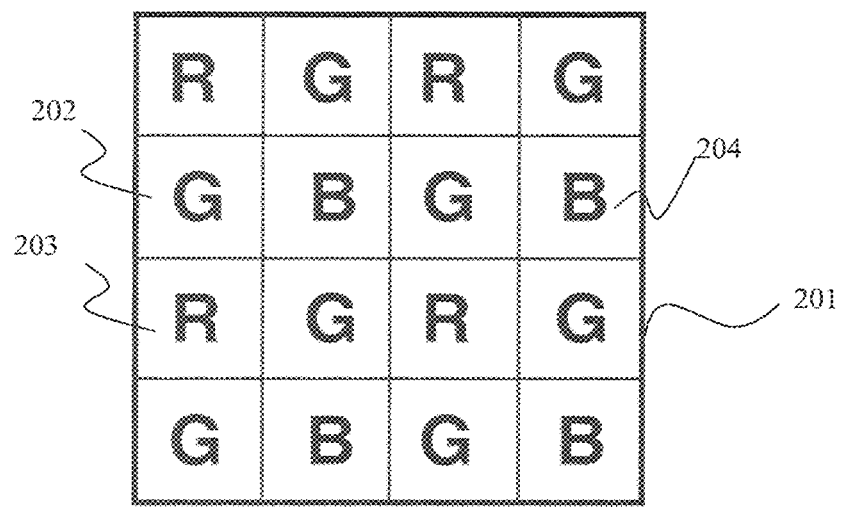
FIG. 2 illustrates a color filter array having multiple pixels, according to one example embodiment.

FIG. 1 illustrates a side view of a single lens camera having a single lens (102) that can include one or more elements and a single sensor (101). FIG. 2 illustrates a sensor array (201) having multiple pixels where the position of the green filter, red filter and blue filter are marked by (202), (203) and (204) respectively. The image that will be taken using this configuration needs to be processed in order to separate the green, red and blue images.

Figure 3:
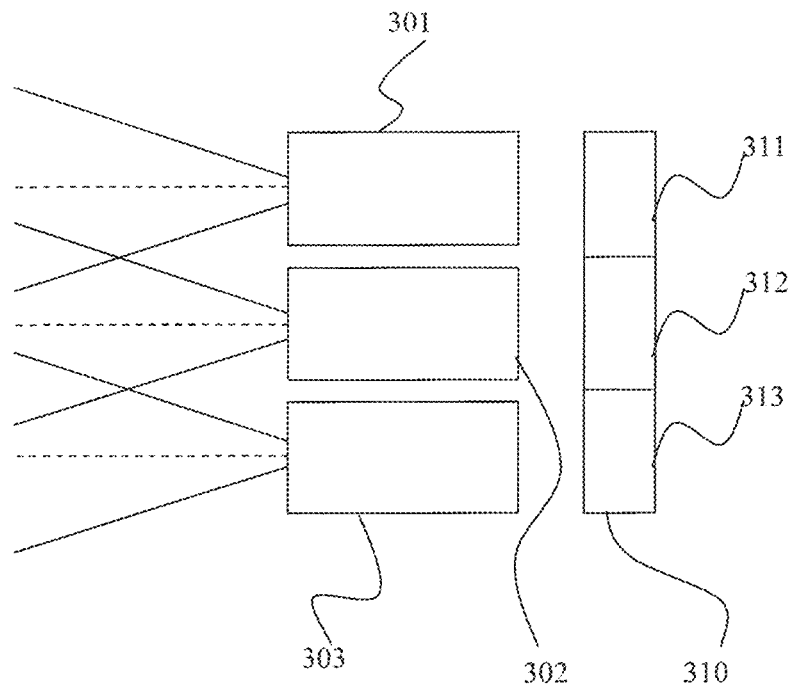
FIG. 3 illustrates a side view of a three lens camera having one image sensor and three lenses, according to one example embodiment.

FIG. 3 illustrates a side view of a three lens camera having one sensor (310) and three lenses (301), (302) and (303). Each one of the said lens will project the image of the same scene on to segments of the sensor marked by (311), (312), and (313) respectively. Each one of the three lenses will have different color filters integrated within the lens, in front of it or between the lens and sensor (310). Using the described configuration the image acquired by the sensor will be composed of two or more smaller images, each imaging information from the scene at different spectrums.

Figure 4:
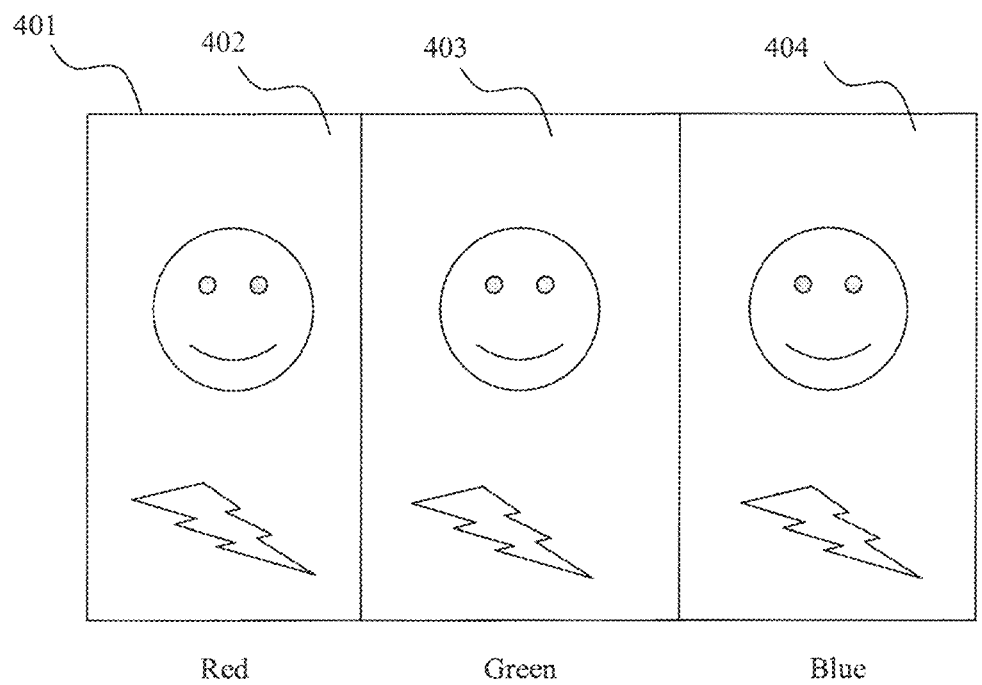
FIG. 4 illustrates an example of a scene as projected on to an image sensor, according to one example embodiment.

FIG. 4 illustrates an example of a scene as projected on to the sensor (401), in each region of the sensor (402), (403) and (404) the same scene is projected but each region will contain information for light at different wavelengths representing different colors according to the filters integrated within the lens that forms the image on each region.

The described configuration does not require the use of a color filter array and therefore the maximal spatial frequency that can be resolved by the sensor can be higher. On the other hand, using smaller lens and smaller active area per channel can result in a smaller focal length of the lens. Therefore, the spatial resolution of objects can be decreased, and the maximal resolvable resolution for each color can remain the same.

The image acquired by the sensor is composed of two or more smaller images, each containing information of the same scene but in different colors. The complete image is then processed and separated in to 3 or more smaller images and combined together to one large color image.

The described method of imaging has many advantages:
1. Shorter lens track (height): Each one of the lenses used can be smaller in size than the single lens covering the same field of view. The total track (height) of each lens can be smaller, allowing the camera to be smaller in height, an important factor for mobile phone cameras, notebook cameras and other applications requiring short optical track.
2. Reduced Color artifacts: Since each color is captured separately, artifacts originating from spatial dependency of each color in a color filter array can be reduced.
3. Lens requirements: Each lens does not have to be optimal for all spectrums used, simplifying the lens design and possibly decreasing the amount of elements used in each lens as no color correction may be needed.
4. Larger Depth of Focus: The depth of focus of a system depends on its focal length. Since smaller lenses are used with smaller focal lengths, the depth of focus is increased by the scale factor, squared.
5. Elimination of focus mechanism: Focus mechanisms can change the distance between the lens and the sensor to compensate for the change in object distance and to assure that the desired distance is in focus during the exposure time. Such a mechanism can be costly and can have many other disadvantages such as increased size, increased power consumption, shutter lag, decreased reliability, and increased price.

Using a fourth lens in addition to the three used for each color red, green and blue (or other colors) with a broad spectral transmission can allow extension of the sensor's dynamic range and can improve the signal-to-noise performance of the camera in low light conditions.

All configurations described above using a fourth lens element can be applied to configurations having two or more lenses.

Another configuration uses two or more lenses with one sensor having a color filter array integrated or on top of the sensor such as a Bayer filter array. In such a configuration no color filter will be integrated in to each lens channel and all lenses will create a color image on the sensor region corresponding to the specific lens. The resulting image will be processed to form one large image combining the two or more color images that are projected on to the sensor.

Dividing the sensor's active area in to 3 areas, one for each of red, green, and blue (for example), can be achieved by placing 3 lenses as illustrated in the figures. The resulting image will include 3 small images containing information of the same scene in a different color.

Figure 5:
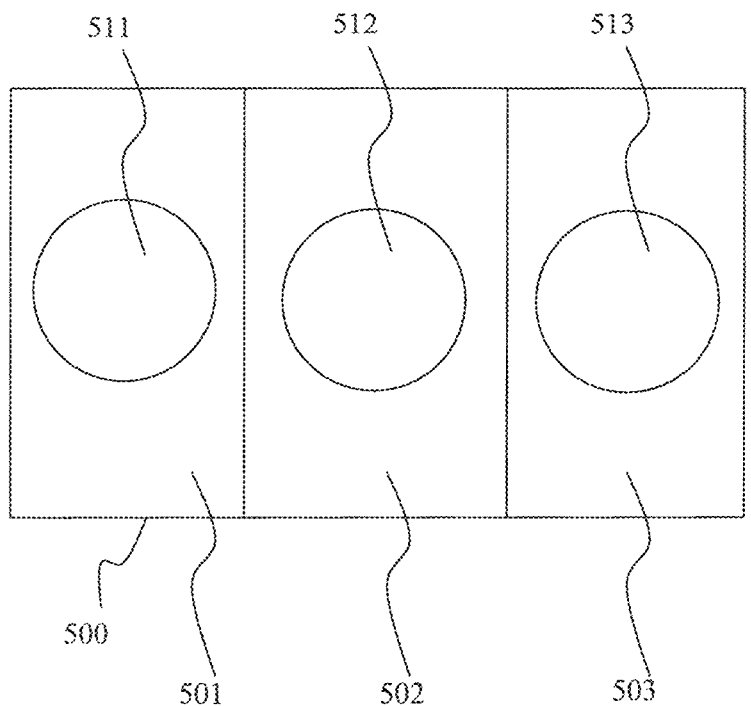
FIG. 5 illustrates a front view of a three lens camera using one rectangular image sensor divided in to three regions, according to one example embodiment.

FIG. 5 illustrates a front view of a three lens camera using one rectangular sensor (500) divided in to three regions (501), (502) and (503). The three lenses (511), (512) and (513) each having different color filters integrated within the lens, in front of the lens or between the lens and the sensor are used to form an image of the same scene but in different colors. In this example each region of the sensor (501), (502) and (503) are rectangular having the longer dimension of the rectangle perpendicular to the long dimension of the complete sensor.

Other three lens configuration can be used, such as using a larger green filtered lens and two smaller lenses for blue and red, such a configuration will results in higher spatial resolution in the green channel since more pixels are being used.

Figure 6:
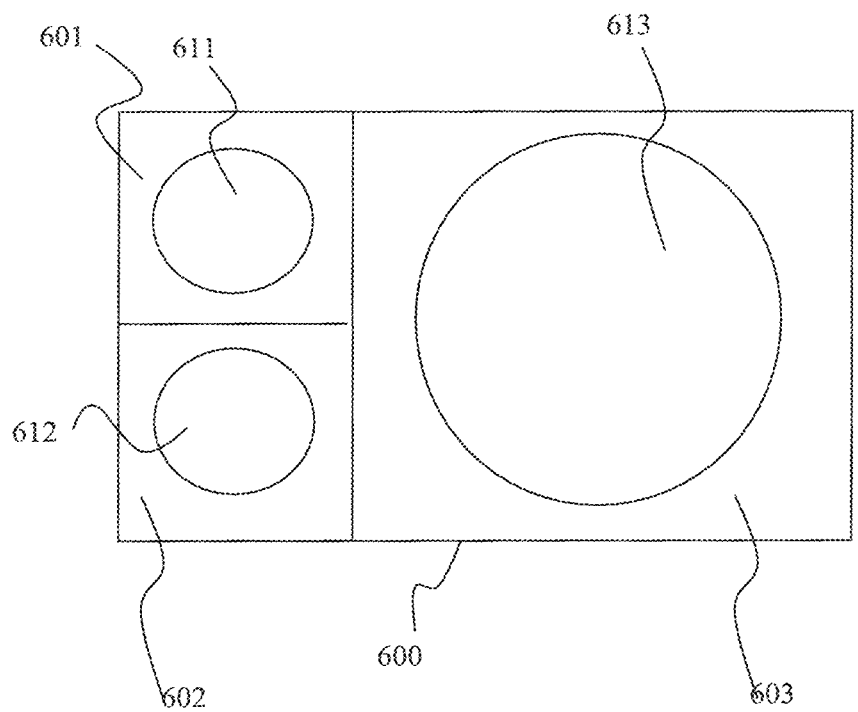
FIG. 6 illustrates a front view of a three lens camera having one image sensor, one large lens and two smaller lenses, according to one example embodiment.

FIG. 6 illustrates a front view of a three lens camera having one sensor (600), one large lens (613) and two smaller lenses (611) and (612). The large lens (613) is used to form an image on the sensor segment marked (603) while the two smaller lenses form an image on the sensor's segments marked with (601) and (602) respectively. The larger lens (613) can use a green color filter while the two smaller lenses (611) and (612) can use a blue and red filter respectively. Other color filters could be used for each lens.

A four lens camera includes 4 lenses each having a different color filter integrated within the lens, in front of the lens, or between the lens and the sensor region corresponding to the lens. The color filter used for two lenses can be the same, resulting in a particular color filter appearing twice among the 4 lenses.

Figure 7:
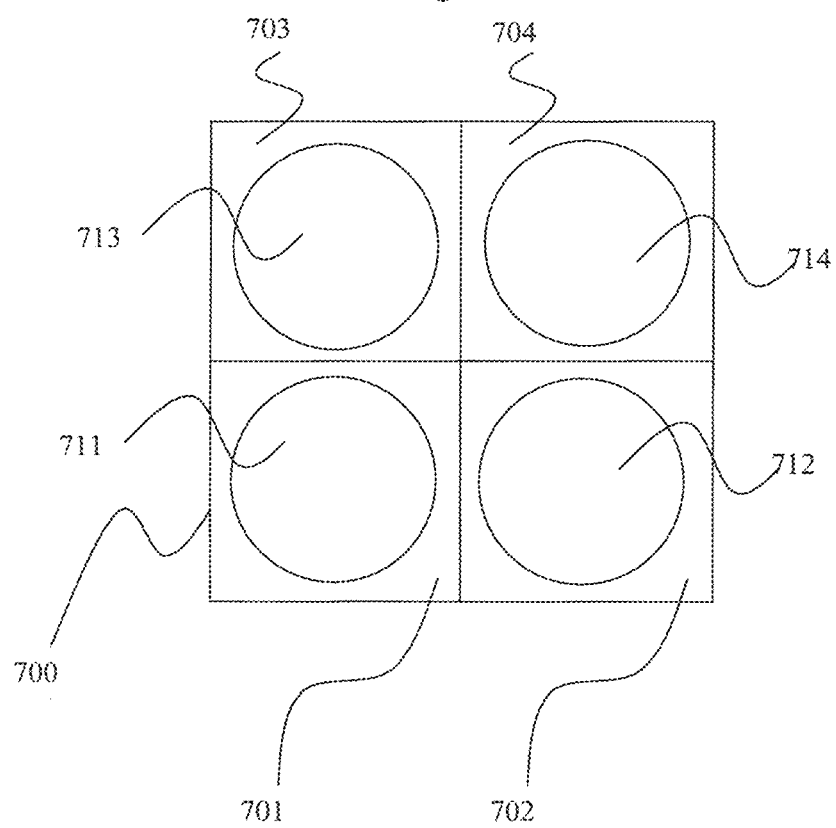
FIG. 7 illustrates a front view of a four lens camera having a one image sensor and four lenses, according to one example embodiment.

FIG. 7 illustrates a front view of a four lens camera having one sensor (700) and four lenses (711), (712), (713) and (714). Each lens forms an image on the corresponding sensor region marked with (701), (702), (703) and (704) respectively. Each one of the lenses will be integrated with a color filter within the lens, in front of the lens, or between the lens and the sensor. All four lenses can be integrated with different color filters, or two of the four lenses can be integrated with the same color filter. For example, two green filters, one blue filter, and one red filter can allow more light collection in the green spectrum.

Figure 8:
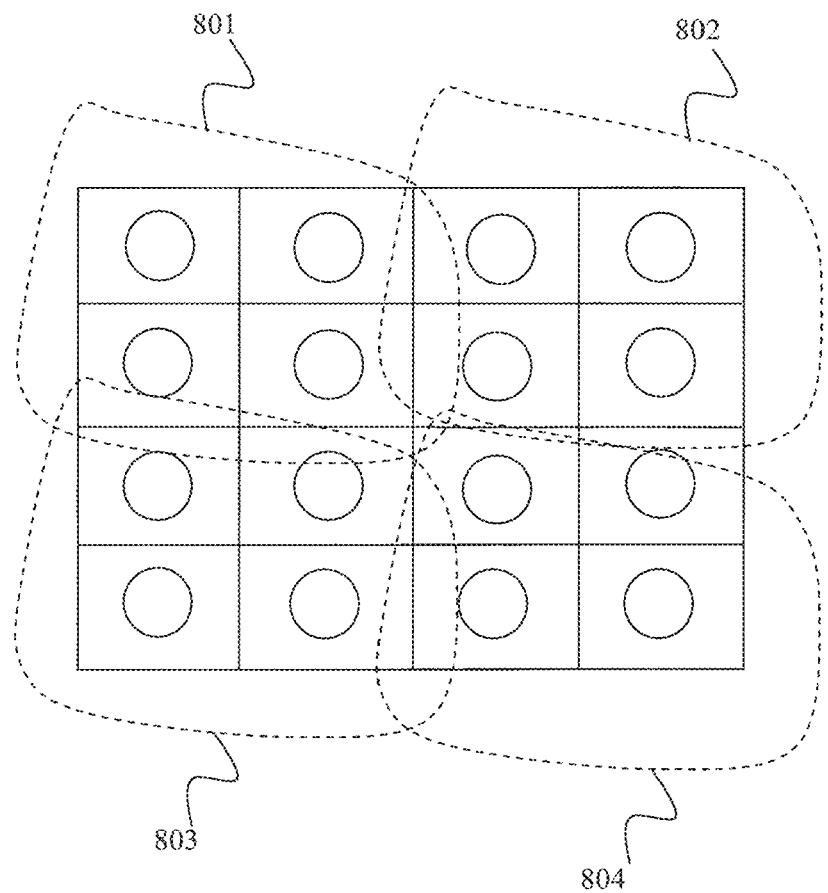
FIG. 8 illustrates a 16 lens camera having four regions, each containing four lenses as illustrated in FIG. 7, according to one example embodiment.

FIG. 8 illustrates a 16 lens camera having 4 regions (801), (802), (803) and (804), each containing four lenses as illustrated in FIG. 7.

Figure 9:
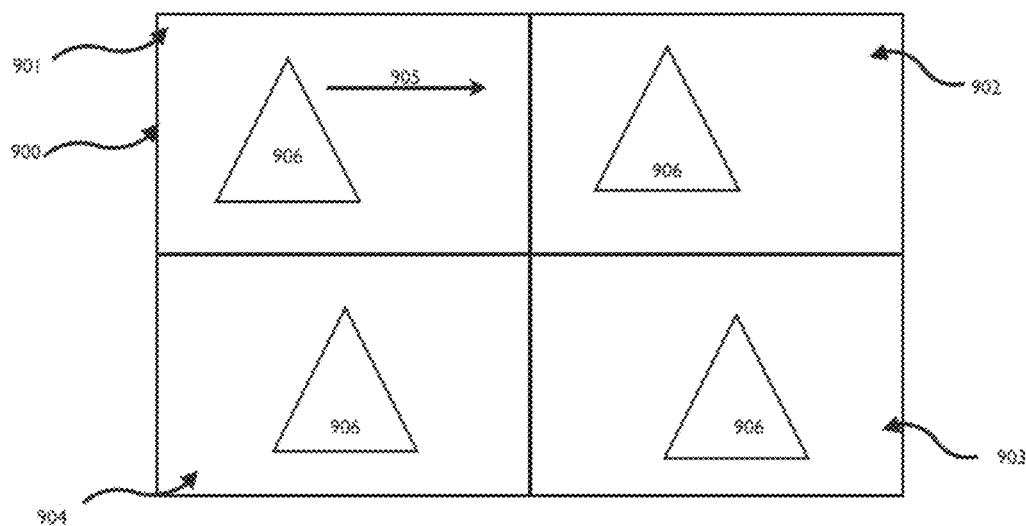
FIG. 9 illustrates an image sensor having four regions, each region associated with a lens, according to one example embodiment.

FIG. 9 illustrates an image sensor 900 having four regions: 901, 902, 903, and 904. Each region is associated with a different lens of a multi-lens camera system. The image sensor of FIG. 9 includes an ERS configured to expose pixel rows sequentially from the top of the top two image sensor regions down towards and through the bottom two image sensor regions. A triangle-shaped object 906 is captured by each of the four image sensor regions through the respective four lenses. The arrow 905 represents the direction of movement of the triangle-shaped object. As a result of standard ERS timing, the position of the triangle object in the top two image sensor regions is different than the position of the triangle in the bottom two image sensor regions.

Figure 10:
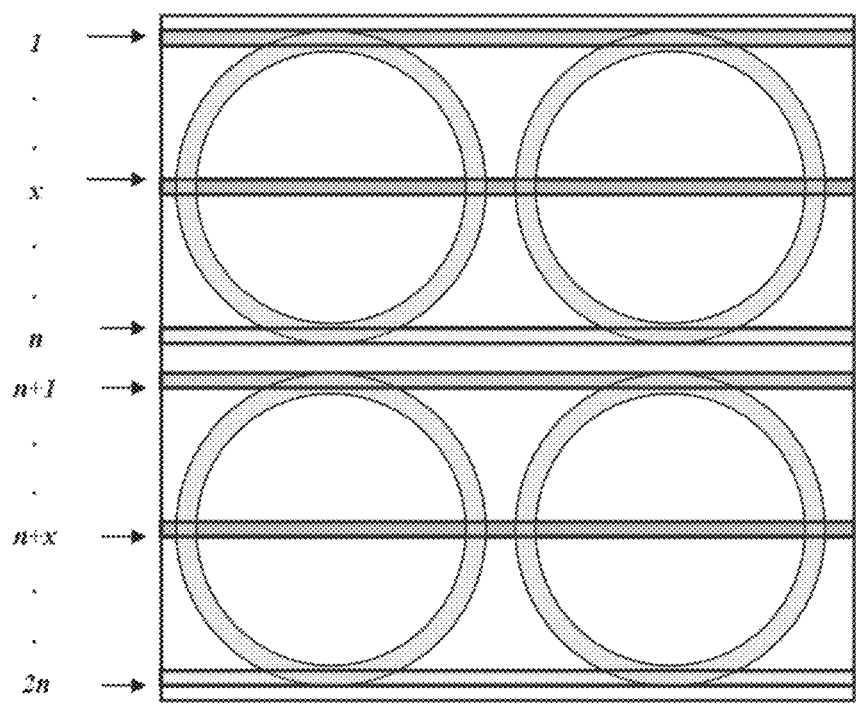
FIG. 10 illustrates an image sensor having four regions configured to manipulate exposure timing, according to one example embodiment.

FIG. 10 illustrates an image sensor with four regions, each associated with a different lens in a multi-lens camera system. The ERS of the image sensor of FIG. 10 is configured to manipulate exposure timing such that the row of pixels represented by the index "1" in FIG. 10 is exposed first, followed by the row of pixels represented by the index "n+1", and so forth according to the pattern: 1, n+1, 2, n+2, ... x, n+x, ..., n, 2n.

In one embodiment, the top-left image sensor region is associated with a lens including a green chromatic filter, the top-right image sensor region is associated with a lens including a red chromatic filter, the bottom-left image sensor region is associated with a blue chromatic filter, and the bottom-right image sensor region is associated with a white chromatic filter. The image sensor can include any number of pixel rows, for instance 1000 pixel rows. It should be noted that although the image sensor of FIG. 10 includes four image sensor regions, an image sensor including any number of regions (for instance 9, 12, 16, etc.) can be implemented according to the principles described herein. Further, in some embodiments, each image sensor region is associated with a separate image sensor.

The invention claimed is:

1. A multi-lens camera system, comprising:
   a plurality of lenses configured to collect light from a field of view and direct the light onto at least one image sensor;
   the at least one image sensor comprising a plurality of image sensor regions, wherein each image sensor region is associated with a different lens and comprises a plurality of pixel lines; and
   an image sensor controller configured to expose, in accordance with an exposure sequence, line-by-line the pixel lines of the image sensor regions to incident light for a time period so as to capture an image representative of the field of view,
   wherein the exposure sequence is adapted to:
      expose a first number of pixel lines, x, in a first image sensor region of the plurality of image sensor regions, the first image sensor region comprising pixel lines 1 to n;
      followed by exposing the corresponding first number of pixel lines in a second image sensor region of the plurality of image sensor regions, the second image sensor region comprising pixel lines n+1 to 2n;
      followed by exposing alternating sequences of x pixel lines from the first sensor region followed by the corresponding x pixel lines from the second sensor region, until all 2n pixel lines have been exposed, and
   wherein the first number of pixel lines, x, is at least 2, but is less than n.

2. The multi-lens camera system of claim 1, wherein the exposure sequence implements exposure of the first and second image sensor regions according to the following pixel line number sequence: 1, 2, n+1, n+2, 3, 4, n+3, n+4, . . . , n−1, n, 2n−1, 2n.

3. The multi-lens camera system of claim 1, wherein the exposure sequence implements exposure of the first and second image sensor regions according to the following pixel line number sequence: pixel lines 1 to x from the first sensor region; followed by pixel lines n+1 to n+x from the second sensor region; followed by pixel lines x+1 to 2x from the first sensor region; followed by pixel lines n+x+1 to n+2x from the second sensor region.

4. The multi-lens camera system of claim 1, wherein the first number of pixel lines in the first image sensor region and the corresponding first number of pixel lines in the second image sensor region are exposed substantially simultaneously.

5. The multi-lens camera system of claim 4, wherein the first number of pixel lines in the first image sensor region and the corresponding first number of pixel lines in the second image sensor region correspond to similarly located portions of the field of view when exposed substantially simultaneously.

6. The multi-lens camera system of claim 4, further comprising a readout line that reads out the at first number of pixel lines in the first image sensor region and the corresponding first number of pixel lines in the second image sensor region when exposed substantially simultaneously.

7. The multi-lens camera system of claim 4, further comprising one or more memory buffers that store the first number of pixel lines in the first image sensor region and the corresponding first number of pixel lines in the second image sensor region when exposed substantially simultaneously.

8. The multi-lens camera system of claim 1, wherein each image sensor region corresponds to a separate image sensor, and wherein the exposure of the image sensors is synchronized, such that the first number of pixel lines in the first image sensor region and a corresponding first number of pixel lines in a third image sensor region of the plurality of image sensor regions are exposed at the same time.

9. The multi-lens camera system of claim 1, wherein at least one lens of the plurality of lenses includes at least one of the following: a neutral density filter, a chromatic filter, or a polarizing filter.

10. The multi-lens camera system of claim 1, wherein the first number of pixel lines in the first image sensor region further comprise the first number of pixel lines in a third image sensor region of the plurality of image sensor regions, and wherein the first number of pixel lines in the third image sensor region and the corresponding first number of pixel lines in the second image sensor region are exposed at different times.

11. The multi-lens camera system of claim 1, wherein the first image sensor region, the second image sensor, the first lens, and the second lens are part of a digital image capture system.

12. A method, comprising:
receiving an input to initiate an image capture operation in a digital image capture system comprising a plurality of lenses configured to collect light from a field of view over at least one image sensor comprising a plurality of image sensor regions, wherein each image sensor region comprises a plurality of pixel lines and receives light from a different one of the plurality of lenses; and
initiating, in response to the input, an image capture operation to capture an image representative of the field of view by at least exposing, in accordance with a exposure sequence, each of the pixel lines for the image sensor regions within a time period,
wherein the exposure sequence is adapted to:
expose a first number of pixel lines, x, in a first image sensor region of the plurality of image sensor regions, the first image sensor region comprising pixel lines 1 to n;
followed by exposing the corresponding first number of pixel lines in a second image sensor region of the plurality of image sensor regions, the second image sensor region comprising pixel lines n+1 to 2n;
followed by exposing alternating sequences of x pixel lines from the first sensor region followed by the corresponding x pixel lines from the second sensor region, until all 2n pixel lines have been exposed, and
wherein the first number of pixel lines, x, is at least 2, but is less than n.

13. The method of claim 12, wherein the exposure sequence exposes the first image sensor region and the second image sensor region according to the following pixel line number sequence: 1, 2, n+1, n+2, 3, 4, n+3, n+4, . . . , n−1, n, 2n−1, 2n.

14. The method of claim 12, wherein the exposure sequence exposes the first image sensor region and the second image sensor region according to the following pixel line number sequence: pixel lines 1 to x from the first sensor region; followed by pixel lines n+1 to n+x from the second sensor region; followed by pixel lines x+1 to 2x from the first sensor region; followed by pixel lines n+x+1 to n+2x from the second sensor region.

15. The method of claim 12, further comprising substantially simultaneously exposing the first number of pixel lines in the first image sensor region and the corresponding first number pixel lines in the second image sensor region.

16. The method of claim 15, wherein first number of pixel lines in the first image sensor region and the corresponding first number of pixel lines in the second image sensor region correspond to similarly located portions of the field of view when exposed substantially simultaneously.

17. The method of claim 12, further comprising reading out, using a readout line, information captured by exposing the first number of pixel lines in the first image sensor region and the corresponding first number of pixel lines in the second image sensor region when exposed substantially simultaneously.

18. The method of claim 17, further comprising storing in one or more memory buffers information from the first number of pixel lines in the first image sensor region and the corresponding first number of pixel lines in the second image sensor region when exposed substantially simultaneously.

19. The method of claim 12, further comprising synchronizing the exposure of the image sensors, such that the first number of pixel lines in the first image sensor region and a corresponding first number of pixel lines in a third image sensor region of the plurality of image sensor regions are exposed at the same time.

20. The method of claim 12, wherein at least one lens of the lenses includes at least one of the following: a neutral density filter, a chromatic filter, or a polarizing filter.

21. The method of claim 12, wherein the first number of pixel lines in the first image sensor region further comprise the first number of pixel lines in a third image sensor region of the plurality of image sensor regions, and wherein the first number of pixel lines in the third image sensor region and the corresponding first number of pixel lines in the second image sensor region are exposed at different times.

22. The method of claim 12, wherein the first image sensor region, the second image sensor, the first lens, and the second lens are part of the digital image capture system.

* * * * *